Oct. 16, 1934.   W. R. HEDEMAN   1,976,938
PRESSURE GAUGE
Filed April 23, 1932
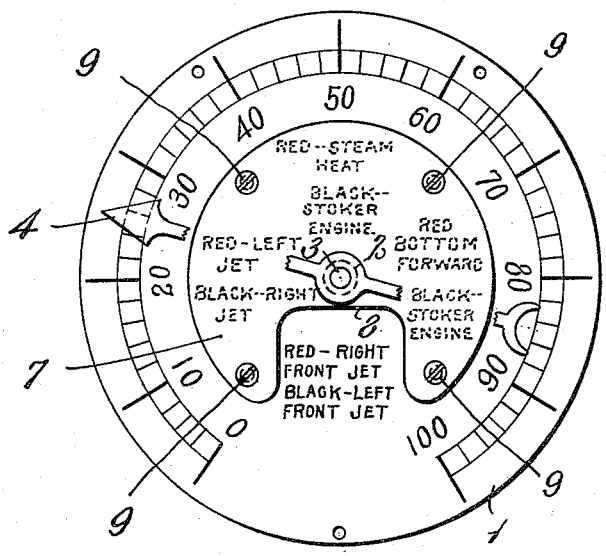
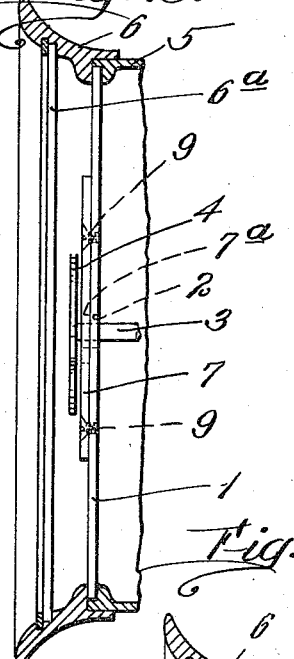
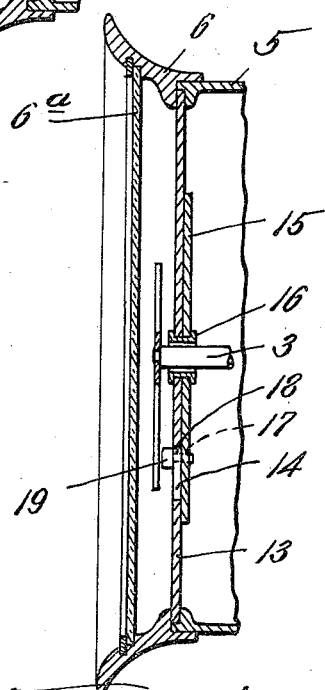
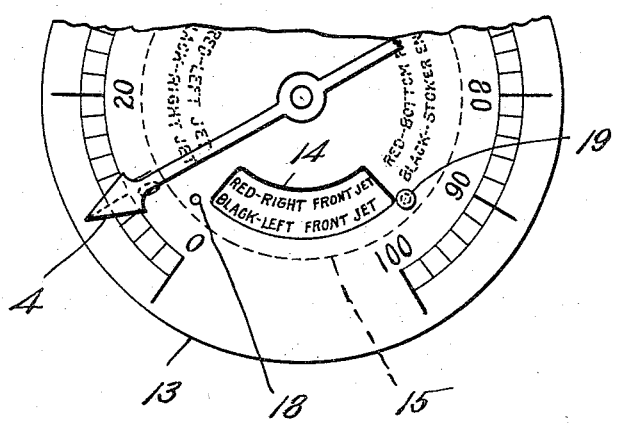
Inventor.
Walter R. Hedeman
by George A Rockwell,
Atty.

Patented Oct. 16, 1934

1,976,938

UNITED STATES PATENT OFFICE 1,976,938

PRESSURE GAUGE

Walter R. Hedeman, Baltimore, Md., assignor to The Ashton Valve Company, Cambridge, Mass., a corporation of Massachusetts Application April 23, 1932, Serial No. 607,162

4 Claims. (Cl. 116—129)

The principal object of my invention is to provide a pressure gauge giving multiple information, that is, different forms of information as to conditions may be read for different conditions by looking at one dial.

A feature of my invention is the use of a dial member and a member, separate from, but mounted in adjacency to, the dial member, one of said members having desired information and both of said members being combined to make said information visible from the front of the dial.

Another feature is the combination of a dial having a window with a member, preferably rotary, at the rear of the dial, said member having a plurality of forms of information, the desired form being brought by rotation of said member into position so as to be visible through said window.

Other features will be fully pointed out below.

In the drawing

Figure 1 is an elevation of a dial and plate forming part of one form of my invention;

Figure 2 is a side view of the dial and plate shown in Figure 1 but showing also a portion of a casing in section and showing also other parts described below;

Figure 3 is an elevation, partly broken away, of a modification described below; and Figure 4 is a central longitudinal section of the form of Figure 3 but showing also a casing and other parts like those in Figure 2.

In the form of Figures 1 and 2 dial plate 1 has central perforation 2 freely traversed by the ordinary indicator shaft 3 carrying an indicator hand 4, said indicator cooperating with the ordinary indicia on the face of the dial, said indicia denoting pressures to be indicated by the gauge. The indicating hand may be operated by a Bourdon spring or otherwise. The dial 1 has impressed on its face and suitably distributed items of information as follows:

Red—steam heat
Black—stoker engine
Red—left jet
Black—right jet
Red—right front jet
Black—left front jet
Red—bottom forward
Black—stoker engine Dial 1 is held in the ordinary manner between elements 5 and 6 which are parts of the ordinary casing, element 6 holding the ordinary glass 6ª in position.

Plate 7 has an opening 8 through which is visible one of the items of information, this plate having holes for screws 9, the latter engaging threaded perforations in dial 1, these perforations being located so as to be at equal distances from the center 2. A perforation 7ª is provided in plate 7 to register with perforation 2, shaft 3 passing freely through perforation 7ª. As shown plate 7 exposes to view through opening 8 one of the items of information, the other items being concealed. If a different item of information is to be exposed to view the screws are removed and the plate is adjusted so that the desired form will appear through opening 8 and then the screws are replaced.

In the form of Figures 3 and 4 the dial 13 has a window or opening 14 and at the rear of the dial is a rotary plate 15 pivotally secured to plate 13 by tubular rivet 16. Rotary plate 15 bears the various items of information desired, such as those on the dial in Figure 1, and may be rotated so that only the desired item will be visible through window 14, the other items being concealed by the dial. When the rotary plate is in the desired position its hole 17 will register with the appropriate hole 18 in dial 13 and a pin 19 is then frictionally inserted to hold the plate in the desired position with relation to the dial. The parts 3, 4, 5, 6, 6ª in Figures 3 and 4 are the same as the corresponding parts in Figures 1 and 2.

It will be clear that I may use a plurality of indicators instead of one. I have provided for two indicators, as an example of such a plurality, by my disclosure in the drawing of, for example, Red—right front jet which is an indication for one indicator while Black—left front jet is an indication available for another indicator in case my invention is used in what is known as a duplex gauge.

What I claim is:

1. A pressure gauge comprising a casing; dial means arranged in said casing and having a set of indicia to denote pressures to be indicated by said gauge, a shaft and an indicating hand carried by said shaft and movable over said indicia, said dial means comprising a plate carrying said indicia and having a central opening through which said shaft freely passes, and a second plate arranged in adjacency to the first mentioned plate and having an opening aligned with the opening in the first plate and freely traversed by said shaft; and means for adjustably securing the second mentioned plate against the first mentioned plate; one of said plates having items of information distributed thereon and covered by said other plate and the other plate having an opening of such size as to expose at a given time certain of said items and said securing means being so arranged as to hold said other plate in proper position to display the desired item of information.

2. A pressure gauge comprising a casing; dial means arranged in said casing and having a set of indicia to denote pressures to be indicated by said gauge, a shaft and an indicating hand carried by said shaft and movable over said indicia, said dial means comprising a plate carrying said indicia and having a central opening through which said shaft freely passes, and a second plate arranged in adjacency to the first mentioned plate and having an opening aligned with the opening in the first plate and freely traversed by said shaft; and means for adjustably securing the second mentioned plate against the first mentioned plate; the plate member carrying said indicia having items of information distributed thereon and covered by said other plate and the other plate having an opening of such size as to expose at a given time certain of said items and said securing means being so arranged as to hold said other plate in proper position to display the desired item of information.

3. A pressure gauge comprising a casing; dial means arranged in said casing and having a set of indicia to denote pressures to be indicated by said gauge, a shaft and an indicating hand carried by said shaft and movable over said indicia, said dial means comprising a plate carrying said indicia and having a central opening through which said shaft freely passes, and a second plate arranged in adjacency to, but at the rear of, the first-mentioned plate and having an opening aligned with the opening in the first plate and freely traversed by said shaft; and means for adjustably securing the second mentioned plate against the rear of the first-mentioned plate; said second-mentioned plate having items of information distributed thereon and covered by the first-mentioned plate, the latter having an opening of such size as to expose at a given time certain of said items and said securing means being so arranged as to hold said second plate in proper position to display the desired item of information.

4. A pressure gauge comprising a casing; dial means arranged in said casing and having a set of indicia to denote pressures to be indicated by said gauge, a shaft and an indicating hand carried by said shaft and movable over said indicia, said dial means comprising a plate carrying said indicia and having a central opening through which said shaft freely passes, and a second plate arranged in adjacency to, but at the rear of, the first-mentioned plate and having an opening aligned with the opening in the first plate and freely traversed by said shaft; and means for rotatably and adjustably securing the second mentioned plate against the rear of the first-mentioned plate; said second-mentioned plate having items of information distributed thereon and covered by the first-mentioned plate, the latter having an opening of such size as to expose at a given time certain of said items and said securing means being so arranged as to hold said second plate in proper position to display the desired item of information.

WALTER R. HEDEMAN.